(56) References Cited

U.S. PATENT DOCUMENTS

| | | | |
|---|---|---|---|
| 2010/0152359 A1 | 6/2010 | Park et al. | |
| 2010/0304171 A1* | 12/2010 | Tomantschger et al. | 428/548 |

FOREIGN PATENT DOCUMENTS

| | | |
|---|---|---|
| CN | 102007183 A | 4/2011 |
| CN | 102108167 A | 6/2011 |
| DE | 19614846 A1 | 10/1997 |
| JP | 7-316243 A | 12/1995 |
| JP | 1998-168297 | 12/1996 |
| JP | 2004346149 A * | 12/2004 |
| JP | 2006-169460 | 6/2006 |
| KR | 10-0440474 A | 5/2003 |
| KR | 10-2007-0066553 A | 6/2007 |
| KR | 10-0781963 B1 | 12/2007 |
| KR | 2006-0051425 A1 | 12/2007 |
| KR | 2008-0036790 A | 4/2008 |
| KR | 10-2008-0043143 A | 5/2008 |
| KR | 10-0887316 B1 | 3/2009 |
| KR | 10-0932759 B1 | 12/2009 |
| KR | 10-2010-0067223 A | 6/2010 |
| KR | 10-2011-0076358 A | 7/2011 |
| KR | 10-1056314 B1 | 8/2011 |
| WO | 2013/094850 A1 | 6/2013 |

OTHER PUBLICATIONS

Derwent abstract of JP 2006-169460 (2006) pp. 1-5.

Office Action in counterpart Chinese Application No. 201280070530.2 dated Nov. 2, 2015, pp. 1-5.

* cited by examiner

THERMOPLASTIC RESIN COMPOSITION AND MOLDING FORM FOR SAME

CROSS-REFERENCE TO RELATED APPLICATIONS

This application claims priority to and the benefit of International Application No. PCT/KR2012/007379, filed Sep. 14, 2012, which published as WO 2013/094850 on Jun. 27, 2013, and Korean Patent Application No. 10-2011-0140658, filed in the Korean Intellectual Property Office on Dec. 22, 2011, the entire disclosure of each of which is incorporated herein by reference.

TECHNICAL FIELD

The present invention relates to a thermoplastic resin composition. More particularly, the present invention relates to a thermoplastic resin composition having improved heat resistance and surface roughness, and a molded product including the same.

BACKGROUND ART

Recently, with the introduction of regulations on TCO Certified Edge and EPEATs (Electronic Product Environmental Assessment Tools), demand for post-consumer materials (PCMs) is increasing together with interest in the development of recycled materials, such as PCM-ABS (acrylonitril-butadiene-styrene copolymer), PCM-PS (polystyrene), PCM-PET (polyethylene terephthalate), PCM-PC (polycarbonate), and the like. Particularly, plastic extrusion/injection technologies employing PET bottle PCMs, which contain small amounts of toxic substances to be broadly used for beverage bottles in the art and are readily available, become an important issue.

Although PET exhibits good properties in terms of weather resistance, impact resistance, chemical resistance, high gloss, and the like, PET has limitations in use for products requiring high heat resistance, such as electric/electronic products, interior/exterior materials of automobiles, and the like, due to hydrolytic characteristics at high temperature and low glass transition temperature thereof.

Korean Patent Publication No. 10-2008-0043143A and No. 10-2007-0066553A disclose a method for improving the degree of crystallization of PET in order to overcome low heat deflection temperature of PET. However, since this method requires a complicated process and complicated equipment and causes contraction and deformation of products, this method has limitations in application to universal products, such as housing materials for electric/electronic products, interior/exterior materials of automobiles, and the like.

In addition, although a method of improving heat deflection temperature using inorganic fillers is disclosed, use of the inorganic fillers provides problems, such as increase in specific gravity, deterioration in inherent elongation, impact resistance and appearance of resins due to deterioration in compatibility with different resins, and the like.

Therefore, there is a need for a technology for blending with a resin having high heat deflection temperature to overcome low heat deflection temperature of polyester resins, and for development of products applicable to automobile components and exterior materials for buildings by overcoming the problem of uneven surface roughness due to low compatibility with other materials.

DISCLOSURE

Technical Problem

It is an aspect of the present invention to provide a thermoplastic resin composition which has good compatibility to provide improved surface roughness and high heat deflection temperature, and a molded product including the same.

It is another aspect of the present invention to provide a thermoplastic resin composition which allows application of recycled materials to achieve eco-friendliness, and a molded product including the same.

It is a further aspect of the present invention to provide a thermoplastic resin composition which has improved wettability through improvement in uniform surface roughness and is applicable to automobile components, electric/electronic products, interior products, and the like.

Technical Solution

One aspect of the present invention relates to a thermoplastic resin composition. The thermoplastic resin composition includes: (A) a rubber-modified aromatic vinyl graft copolymer resin; (B) a polyester resin; (C) a maleimide-based polymer; (D) a modified aromatic vinyl compound-vinyl cyanide compound copolymer resin containing a functional group capable of reacting with polyester; and (E) an aromatic vinyl resin copolymerized with an alkyl(meth)acrylate, wherein the (E) aromatic vinyl resin copolymerized with an alkyl(meth)acrylate is present in an amount of about 6 wt % to about 12 wt % based on a total amount of the thermoplastic resin composition.

In one embodiment, the polyester resin (B) may be a recycled polyester resin.

In one embodiment, the maleimide-based polymer (C) may have a weight average molecular weight of about 80,000 g/mol to about 200,000 g/mol.

In one embodiment, the maleimide-based polymer (C) may contain about 20 mol % to about 55 mol % of repeat units derived from maleimide.

In one embodiment, the maleimide-based polymer (C) may be a copolymer of an N-substituted maleimide, an unsaturated dicarboxylic acid anhydride, and a vinyl monomer.

In one embodiment, the modified aromatic vinyl compound-vinyl cyanide compound copolymer resin (D) may have a weight average molecular weight of about 50,000 g/mol to about 200,000 g/mol.

In one embodiment, the thermoplastic resin composition may include about 1 wt % to about 40 wt % of the maleimide-based polymer (C) based on a total weight of the composition.

In one embodiment, the modified aromatic vinyl compound-vinyl cyanide compound copolymer resin (D) may be a copolymer of about 0.01 mol % to about 5 mol % of (d1) an unsaturated compound represented by the following Formula 1 and (d2) about 95 mol % to about 99.99 mol % of a vinyl-based compound.

[Formula 1]

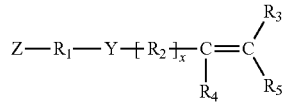

In Formula 1, $R_3$, $R_4$ and $R_5$ are each independently hydrogen (H), a $C_1$~$C_{12}$ alkyl group or unsaturated alkyl group, a $C_6$~$C_{14}$ aryl group, or a $C_1$~$C_{12}$ alkyl-substituted aryl group or unsaturated alkyl-substituted aryl group; Y is an ether group (—O—), a carboxyl group (—O—[C=O]—, —[O=C]—O—), a $C_1$~$C_{12}$ alkylene group, a $C_6$~$C_{14}$ arylene group, or a $C_1$~$C_{12}$ alkyl-substituted arylene group; when Y is an ether group or a carboxyl group, each of $R_1$ and $R_2$ is a $C_1$~$C_{12}$ alkylene group, a $C_6$~$C_{14}$ arylene group, or a $C_1$~$C_{12}$ alkyl-substituted arylene group, and when Y is a $C_1$~$C_{12}$ alkylene group or a $C_6$~$C_{14}$ arylene group or alkyl-substituted arylene group, Y represents ($R_1$—Y—$R_2$); x is 0 or 1; and Z is an epoxy group, a carboxylic acid group, an isocyanate group, an oxadiazol group, an amine group, or a hydroxyl group.

In one embodiment, the (E) aromatic vinyl resin copolymerized with an alkyl(meth)acrylate may have a weight average molecular weight of about 80,000 g/mol to about 200,000 g/mol.

Another aspect of the present invention relates to a molded product formed from the thermoplastic resin composition. The molded product is obtained by molding the thermoplastic resin composition and has an average surface roughness (Ra) of about 10 nm to about 62 nm as measured using an optical profiler (NT1100).

In one embodiment, the molded product may have a metal layer formed on a surface thereof.

Advantageous Effects

The present invention provides a thermoplastic resin composition, which has good compatibility to provide excellent surface roughness and high heat deflection temperature, allows application of recycled materials to achieve eco-friendliness, and has excellent wettability to be applicable to automobile components, electric/electronic products, interior products, and the like, and molded products thereof.

BEST MODE

According to the present invention, a thermoplastic resin composition includes (A) a rubber-modified aromatic vinyl graft copolymer resin, (B) a polyester resin, (C) a maleimide-based polymer, (D) a modified aromatic vinyl compound-vinyl cyanide compound copolymer resin including a functional group capable of reacting with polyester, and (E) an aromatic vinyl resin copolymerized with an alkyl(meth)acrylate.

In one embodiment, the thermoplastic resin composition includes about 10 wt % to about 50 wt % of the (A) rubber-modified aromatic vinyl graft copolymer resin; about 10 wt % to about 60 wt % of the (B) polyester resin; about 1 wt % to about 40 wt % of the (C) maleimide-based polymer; about 5 wt % to about 40 wt % of the (D) modified aromatic vinyl compound-vinyl cyanide compound copolymer resin including a functional group capable of reacting with polyester; and about 6 wt % to about 12 wt % of the (E) aromatic vinyl resin copolymerized with an alkyl(meth)acrylate.

Now, each component of the thermoplastic resin composition according to the present invention will be described in detail.

(A) Rubber-Modified Aromatic Vinyl Graft Copolymer Resin

The rubber-modified aromatic vinyl graft copolymer resin (A) according to the present invention is a polymer in which a rubber phase polymer is dispersed in particle form in a matrix (continuous phase) composed of an aromatic vinyl copolymer.

The rubber-modified aromatic vinyl graft copolymer resin (A) may be prepared by any known polymerization method, such as emulsion polymerization, suspension polymerization, bulk polymerization, and the like. For example, the rubber-modified aromatic vinyl graft copolymer resin may be prepared by mixing and extruding an aromatic vinyl graft copolymer resin alone or in combination with an aromatic vinyl copolymer resin. In bulk polymerization, the rubber-modified aromatic vinyl graft copolymer resin may be prepared by a single step reaction without separate preparation of the aromatic vinyl graft copolymer resin and the aromatic vinyl copolymer resin.

In the rubber-modified aromatic vinyl graft copolymer resin (A), the rubber phase polymer may be present in an amount of about 5 wt % to about 30 wt %. Within this range, the thermoplastic resin composition provides effective impact resistance without deteriorating flowability of the resin.

To secure suitable properties in melt mixing of the rubber-modified aromatic vinyl graft copolymer resin (A) and the polyester resin (B), the rubber phase polymer may have a Z-average particle size from about 0.1 μm to about 1 μm. Preferably, the rubber phase polymer has a Z-average particle size from about 0.2 μm to about 0.5 μm.

Examples of the rubber-modified aromatic vinyl graft copolymer resin (A) may include acrylonitrile-butadiene-styrene (ABS), acrylonitrile-styrene-acrylic rubber (ASA), acrylonitrile-ethylene propylene rubber-styrene (AES) copolymer resins, and the like.

The rubber-modified aromatic vinyl graft copolymer resin (A) may be prepared using (A1) an aromatic vinyl graft resin alone or in combination with (A2) an aromatic vinyl copolymer resin. Each of these resins may be formulated in consideration of compatibility thereof.

In one embodiment, the rubber-modified aromatic vinyl graft copolymer resin (A) may be prepared by mixing about 20 wt % to about 100 wt % of the (A1) aromatic vinyl graft resin and, optionally, about 80 wt % or less of the (A2) aromatic vinyl copolymer resin, without being limited thereto.

In one embodiment, the rubber-modified aromatic vinyl graft copolymer resin (A) may be present in an amount of about 10 wt % to about 50 wt %, preferably about 20 wt % to about 40 wt %, based on the total amount of the resin composition. Within this range, the resin composition can exhibit excellent properties in terms of impact resistance, chemical resistance, and hydrolysis resistance.

(A1) Aromatic Vinyl Graft Copolymer Resin

The aromatic vinyl graft copolymer resin (A1) may be prepared by adding an aromatic vinyl monomer capable of being grafted to the rubber phase polymer and a monomer copolymerizable with the aromatic vinyl monomer to the rubber phase polymer, followed by polymerization.

Examples of the rubber phase polymer may include diene rubbers such as polybutadiene, poly(styrene-butadiene), and poly(acrylonitrile-butadiene) rubbers; acrylic rubbers, such as saturated rubbers produced by adding hydrogen to the diene rubbers, isoprene rubbers, chloroprene rubbers, and butyl acrylate rubbers; and ethylene/propylene/diene monomer (EPDM) terpolymer, and the like. Among these rubbers, polybutadiene rubber is preferred.

The rubber phase polymer may be present in an amount about 5 wt % to about 30 wt % in the aromatic vinyl graft copolymer resin (A1). In addition, the rubber particles (the rubber phase polymer) may have a Z-average particle size of about 0.1 µm to about 1 µm by taking into account impact resistance and appearance in preparation of the graft copolymer.

Examples of the aromatic vinyl monomer capable of being grafted to the rubber phase polymer may include styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and the like. Styrene is preferably used. The aromatic vinyl monomer may be present in an amount of about 30 wt % to about 94 wt % in the aromatic vinyl graft copolymer resin (A1).

Examples of the monomer copolymerizable with the aromatic vinyl monomer may include saturated nitriles such as acrylonitrile, unsaturated nitriles such as methacrylonitrile, and mixtures thereof. Acrylonitrile is preferably used. The copolymerizable monomer may be present in an amount of about 1 wt % to about 40 wt % in the aromatic vinyl graft copolymer resin (A1).

When preparing the aromatic vinyl graft copolymer, monomers for imparting processability and heat resistance may be further added. For example, monomers such as acrylic acid, methacrylic acid, maleic anhydrides, N-substituted maleimides, and the like may be further added. These monomers may be optionally added in an amount of about 50 wt % or less in the aromatic vinyl graft copolymer resin (A1).

(A2) Aromatic Vinyl Copolymer Resin

The aromatic vinyl copolymer resin (A2) may be prepared by polymerizing the aromatic vinyl monomer and the monomer copolymerizable with the aromatic vinyl monomer excluding the rubber phase polymer among the components of the aromatic vinyl graft copolymer resin (A1).

Examples of the aromatic vinyl monomer used in the aromatic vinyl copolymer resin (A2) may include styrene, α-methyl styrene, β-methyl styrene, p-methyl styrene, p-t-butyl styrene, ethyl styrene, vinyl xylene, monochlorostyrene, dichlorostyrene, dibromostyrene, vinyl naphthalene, and the like. The aromatic vinyl monomer may be present in an amount of about 60 wt % to about 90 wt % in the aromatic vinyl copolymer resin (A2).

Examples of the monomer copolymerizable with the aromatic vinyl monomer may include saturated nitriles such as acrylonitrile, unsaturated nitriles such as methacrylonitrile, and mixtures thereof. Acrylonitrile is preferably used. The copolymerizable monomer may be present in an amount of about 10 wt % to about 40 wt % in the aromatic vinyl copolymer resin (A2).

The aromatic vinyl copolymer resin (A2) may further include monomers such as acrylic acid, methacrylic acid, maleic anhydrides, N-substituted maleimides, and the like to improve processability and heat resistance. These monomers may be optionally added in an amount of about 80 wt % or less in the aromatic vinyl copolymer resin (A2).

The aromatic vinyl copolymer resin (A2) may have a weight average molecular weight of about 80,000 g/mol to about 200,000 g/mol. Within this range, the resin composition can secure excellent mechanical properties.

(B) Polyester Resin

According to the present invention, the polyester resin (B) may be polyester resins having an intrinsic viscosity from about 0.3 dL/g to about 1.5 dL/g or a copolymer thereof.

The polyester resin (B) is generally obtained by polycondensation of, terephthalic acid (TPA), isophthalic acid (IPA), 1,2-naphthalene dicarboxylic acid, 1,4-naphthalene dicarboxylic acid, 1,5-naphthalene dicarboxylic acid, 1,6-naphthalene dicarboxylic acid, 1,7-naphthalene dicarboxylic acid, 1,8-naphthalene dicarboxylic acid, 2,3-naphthalene dicarboxylic acid, 2,6-naphthalene dicarboxylic acid, and 2,7-naphthalene dicarboxylic acid, aromatic dicarboxylates whose acids are substituted with methyl groups such as dimethyl terephthalate (DMT), dimethyl isophthalate, alkyl ester of naphthalene dicarboxylate, dimethyl-1,2-naphthalate, dimethyl-1,5-naphthalate, dimethyl-1,7-naphthalate, dimethyl-1,7-naphthalate, dimethyl-1,8-naphthalate, dimethyl-2,3-naphthalate, dimethyl-2,6-naphthalate, dimethyl-2,7-naphthalate, or mixtures thereof, with diols, such as $C_2$ to $C_{12}$ ethylene glycol, 1,2-propylene glycol, 1,3-propylene glycol, 2,2-dimethyl-1,3-propanedoil, 2,2-dimethyl-1,3-propylene glycol, 1,3-butanediol, 1,4-butanediol, 1,5-pentanediol, 1,5-pentanediol, 1,6-hexanediol, 1,3-cyclohexane dimethanol, 1,4-cyclohexane dimethanol, or mixtures thereof. Preparation of the polyester resin can be easily carried out by those skilled in the art.

In one embodiment, the polyester resin (B) may be a recycled polyester resin. The recycled polyester resin may be obtained from various products such as PET bottles, PBT, polyester fibers, polyester films, and the like. Examples of usable recycled polyester resins may include polyethylene terephthalate, polybutylene terephthalate, polyethylene naphthalate, polybutylene naphthalate, polypropylene terephthalate, polyethylene terephthalate glycol, and the like, without being limited thereto.

In one embodiment, the recycled polyester resin may have an intrinsic viscosity from about 0.4 dL/g to about 1.5 dL/g. Within this range, the polyester resin can secure impact resistance and chemical resistance, and does not cause any process problems. Preferably, the recycled polyester resin has an intrinsic viscosity from about 0.5 dL/g to about 1.2 dL/g, more preferably from about 0.6 dL/g to about 1.0 dL/g.

Recycled polyester resin obtained from PET bottles or polyester extrudates, injection molded articles and the like typically has an intrinsic viscosity of about 0.4 dL/g or higher. Recycled polyester resin having an intrinsic viscosity of about 0.4 dL/g to about 1.5 dL/g may be used without additional processing, or may be used as a raw material after washing and pulverization. Alternatively, such a recycled polyester resin may be used in pellet form after extrusion, as needed.

Recycled polyester resin obtained from polyester fibers, films and the like typically has an intrinsic viscosity of less than about 0.4 dL/g. When such a recycled polyester resin having an intrinsic viscosity of less than about 0.4 dL/g is used, it can be difficult to achieve desired mechanical properties due to reduction in molecular weight. Accordingly, when the recycled polyester resin having an intrinsic viscosity of less than 0.4 dL/g is used as a raw material, the recycled polyester resin is used after increasing the intrinsic viscosity thereof to fall within the range of about 0.4 dL/g to about 1.5 dL/g. In some embodiments, the recycled polyester resin having an intrinsic viscosity of about 0.4 dL/g to about 1.5 dL/g is used by mixing a recycled polyester resin having an intrinsic viscosity of less than about 0.4 dL/g with a thickening agent and extruding the mixture to adjust the intrinsic viscosity of the recycled polyester resin. Here, the thickening agent may be a compound having at least two functional groups capable of reacting with a hydroxyl group and a carboxyl group of the polyester and capable of linking polyester polymer chains. Although not particularly limited to certain functional groups, an epoxy group, maleic anhydride, maleic acid, an amine group, and the like may be used as the functional groups. In some embodiments, triglycidyl isocyanurate may be used. The thickening agent may be added in an amount of about 0.001 to about 5 parts by weight, preferably about 0.005 to about 2.5 parts by weight, more preferably about 0.01 to about 1 part by weight, based on 100 parts by weight of the recycled polyester resin. In some embodiments, after the recycled polyester resin is mixed with the thickening agent, the mixture is subjected to extrusion molding using a typical twin-screw extruder at about 160° C. to about 280° C. to prepare pellets.

According to the present invention, the polyester resin (B) may be present in an amount of about 10 wt % to about 60 wt %, preferably about 11 wt % to about 50 wt %, more preferably about 12 wt % to about 40 wt %, in the total weight of the thermoplastic resin composition. Within this range, the thermoplastic resin composition can exhibit good balance of impact resistance and chemical resistance.

(C) Maleimide-Based Polymer

The maleimide-based polymer (C) may contain about 20 mol % to about 55 mol %, preferably about 25 mol % to about 50 mol % of repeat units derived from maleimide. Within this range, the thermoplastic resin composition can exhibit good balance of impact resistance and chemical resistance.

In one embodiment, the maleimide-based polymer (C) may be a copolymer of an N-substituted maleimide and a vinyl monomer.

In exemplary embodiments, the maleimide-based polymer (C) may be a copolymer of an N-substituted maleimide, an unsaturated dicarboxylic acid anhydride, and a vinyl monomer. For example, the maleimide-based polymer (C) may be a copolymer of about 20 wt % to about 60 wt % of a first monomer comprising maleic anhydride and an N-substituted maleimide; and about 40 wt % to about 80 wt % of a second monomer selected from among an aromatic vinyl compound, a mixture of the aromatic vinyl compound and a vinyl cyanide compound, and combinations thereof. Within these ranges of the first and second monomers, the thermoplastic resin composition can exhibit good impact resistance and heat resistance.

In one embodiment, the maleimide-based polymer (C) may be composed of about 44 wt % to about 50 wt % of styrene, about 45 wt % to about 55 wt % of N-phenyl maleimide and about 1 wt % to about 5 wt % of maleic anhydride.

The first monomer may be composed of about 90 wt % to about 99 wt % of maleic anhydride and about 1 wt % to about 10 wt % of the N-substituted maleimide.

The N-substituted maleimide constituting the first monomer may include N-methyl maleimide, N-ethyl maleimide, N-cyclohexyl maleimide, N-phenyl maleimide, and the like. These may be used alone or as mixtures thereof.

The aromatic vinyl compound constituting the second monomer may include styrene, α-methyl styrene, p-t-butyl styrene, 2,4-dimethyl styrene, vinyl toluene, and the like. These may be used alone or as mixtures thereof. In addition, the vinyl cyanide compound may include acrylonitrile, methacrylonitrile, ethacrylonitrile, and the like. These may be used alone or as mixtures thereof.

The maleimide-based polymer (C) may have a weight average molecular weight from about 80,000 g/mol to about 200,000 g/mol. Within this weight average molecular weight range of the maleimide-based polymer, the thermoplastic resin composition exhibits excellent heat deflection temperature and impact resistance.

The maleimide-based polymer (C) may have a glass transition temperature of 190° C. to 200° C. and a fluidity of 2.0 g/10 min. to 5.0 g/10 min (at 260° C./10 kg).

The thermoplastic resin composition may include 1 wt % to 40 wt % of the maleimide-based polymer (C) based on the total weight of the composition. Within this range, the thermoplastic resin composition has uniform surface roughness and excellent heat resistance without deterioration in flowability. The maleimide-based polymer (C) is preferably present in an amount of 5 wt % to 35 wt %, more preferably 10 wt % to 30 wt % in the thermoplastic resin composition.

(D) Modified Aromatic Vinyl Compound-Vinyl Cyanide Compound Copolymer Resin Containing Functional Group Capable of Reacting with Polyester According to the present invention, the modified aromatic vinyl compound-vinyl cyanide compound copolymer resin (D) includes a functional group capable of reacting with polyester. For example, the modified aromatic vinyl compound-vinyl cyanide compound copolymer resin (D) is a resin which is prepared by polymerization such that the functional group capable of reacting with polyester is present in a vinyl-based resin.

In one embodiment, the modified aromatic vinyl compound-vinyl cyanide compound copolymer resin (D) is a copolymer of (d1) an unsaturated compound including the functional group capable of reacting with polyester and (d2) a vinyl-based compound. For example, the modified aromatic vinyl compound-vinyl cyanide compound copolymer resin (D) is a copolymer of about 0.01 mol % to about 5 mol % of the (d1) unsaturated compound including the functional group capable of reacting with polyester and about 95 mol % to about 99.99 mol % of (d2) the vinyl-based compound.

The modified aromatic vinyl compound-vinyl cyanide compound copolymer resin (D) of the present invention may have a weight average molecular weight from about 50,000 g/mol to about 200,000 g/mol. Within this range of the weight average molecular weight, the copolymer resin can secure excellent reactivity and mechanical properties.

In the present invention, the modified aromatic vinyl compound-vinyl cyanide compound copolymer resin (D) may be present in an amount of about 5 wt % to about 40 wt %, preferably about 10 wt % to about 35 wt %, in the composition. Within this content range, the thermoplastic resin composition has good balance between flowability, heat resistance and surface roughness.

(d1) Unsaturated Compound including a Functional Group Capable of Reacting with Polyester The unsaturated compound (d1) may be represented by Formula 1.

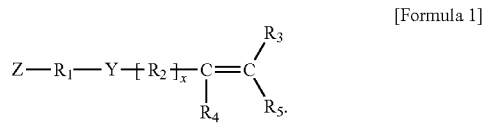

[Formula 1]

In Formula 1, $R_3$, $R_4$ and $R_5$ are each independently hydrogen (H), a $C_1$~$C_{12}$ alkyl group or unsaturated alkyl group, a $C_6$~$C_{14}$ aryl group, or a $C_1$~$C_{12}$ alkyl-substituted aryl group or unsaturated alkyl-substituted aryl group; Y is an ether group (—O—), a carboxyl group (—O—[C=O]—, —[O=C]—O—), a $C_1$~$C_{12}$ alkylene group, a $C_6$~$C_{14}$ arylene group, or a $C_1$~$C_{12}$ alkyl-substituted arylene group; when Y is an ether group or a carboxyl group, each of $R_1$ and $R_2$ is a $C_1$~$C_{12}$ alkylene group, a $C_6$~$C_{14}$ arylene group, or a $C_1$~$C_{12}$ alkyl-substituted arylene group, and when Y is a $C_1$~$C_{12}$ alkylene group or a $C_6$~$C_{14}$ arylene group or alkyl-substituted arylene group, Y represents (R₁—Y—R₂); x is 0 or 1; and Z is an epoxy group, a carboxylic acid group, an isocyanate group, an oxadiazol group, an amine group, or a hydroxyl group.

Examples of the unsaturated compound (d1) may include epoxy group-containing monomers such as epoxy alkyl acrylate, allyl glycidyl ester, aryl glycidyl ester, glycidyl methacrylate, glycidyl acrylate, butadiene monoxide, vinyl glycidyl ether, and glycidyl itaconate; carboxylic acid group-containing monomers such as acrylic acid, methacrylic acid, 2-butanoic acid, 2-methyl-2-butanoic acid, undecylenic acid, oleic acid, sorbic acid, linoleic acid, crotonic acid, and itaconic acid; isocyanate group-containing monomers such as vinyl isocyanate, acryl isocyanate, and methacryl isocyanate; amine group-containing monomers such as vinyl amine, acryl amine, and methacryl amine; and hydroxy group-containing monomers such as hydroxy vinyl ether, hydroxy ethyl acrylate, hydroxy ethyl methacrylate, hydroxy propyl acrylate, hydroxy propyl methacrylate, 2-hydroxy acrylate, and 3-phenoxypropyl acrylate, without being limited thereto. Thereamong, the epoxy group-containing monomers are preferable. These unsaturated compounds may be used alone or in combination thereof.

The unsaturated compound (d1) may be present in an amount of about 0.01 mol % to about 5 mol %, preferably about 0.1 mol % to about 4 mol %, in the form of a monomer for copolymerization. Within this range, the thermoplastic resin composition can obtain improvement of impact strength in an optimal range and can minimize gelation upon extrusion.

(d2) Vinyl-Based Compound

The vinyl-based compound (d2) includes an aromatic vinyl monomer and a monomer copolymerizable with the aromatic vinyl monomer.

In one embodiment, the aromatic vinyl monomer may be represented by Formula 2.

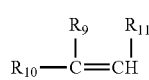

[Formula 2]

In Formula 2, $R_9$ is hydrogen or a methyl group; $R_{10}$ is a phenyl group, a halophenyl group, an alkylphenyl group, an alkylhalophenyl group, a naphthalene group, or an alkylnaphthalene group; and $R_{11}$ is hydrogen, a methyl group, and the like.

Wherein, the halophenyl group is a phenyl group substituted with one to three halogen compounds, the alkylphenyl group is a phenyl group substituted with one or two alkyl groups, the alkylhalophenyl group is a phenyl group substituted with an alkyl group containing a halogen compound or a phenyl group substituted with halogen and an alkyl group, and the alkylnaphthalene group is naphthalene substituted with one to four alkyl groups.

Examples of the aromatic vinyl monomer may include styrene, α-methyl styrene, β-methyl styrene, p-methyl styrene, p-t-butyl styrene, ethyl styrene, vinyl xylene, monochlorostyrene, dichlorostyrene, dibromostyrene, and vinyl naphthalene, without being limited thereto. Styrene is most preferable. These aromatic vinyl monomers may be used alone or as mixtures thereof.

The monomer copolymerizable with the aromatic vinyl monomer is preferably a vinyl cyanide monomer, such as acrylonitrile, methacrylonitrile, and ethacrylonitrile, without being limited thereto. These may be used alone or as mixtures thereof. Thereamong, acrylonitrile is preferred.

The amounts of the aromatic vinyl monomer and the monomer copolymerizable with the aromatic vinyl monomer are determined depending upon compatibility and the ratio of monomers excluding rubbers among the components of the aromatic vinyl graft copolymer resin (A). Preferably, the aromatic vinyl monomer is present in an amount of about 50 wt % to about 99 wt % and the monomer copolymerizable with the aromatic vinyl monomer is present in an amount of about 1 wt % to about 50 wt %. More preferably, the aromatic vinyl monomer is present in an amount of about 60 wt % to about 90 wt % and the monomer copolymerizable with the aromatic vinyl monomer is present in an amount of about 10 wt % to about 40 wt %. Within this range, the thermoplastic resin composition can obtain desired effects in terms of processability and strength.

The vinyl-based compound (d2) according to the invention may optionally further include an ethylenically unsaturated monomer to improve the properties of a copolymer such as processability and heat resistance. Examples of the ethylenically unsaturated monomer may include aromatic esters of acrylic or methacrylic acid such as methyl methacrylate, $C_1$~$C_4$ alkyl methacrylates, phenyl acrylate, phenyl methacrylate, benzyl acrylate, benzyl methacrylate, 2-phenylethyl acrylate, 2-phenylethyl methacrylate, 2-phenoxyethyl acrylate and 2-phenoxyethyl methacrylate; N-substituted maleimides such as N-methylmaleimide, N-phenylmaleimide and N-cyclohexylmaleimide; acrylic acid, methacrylic acid and dicarboxylic acid such as maleic acid, fumaric acid, itaconic acid and anhydrides thereof and nitrogen-functional monomers such as dimethylaminoethyl acrylate, diethylaminoethyl acrylate, vinylimidazole, vinylpyrrolidone, vinyl caprolactam, vinylcarbazole, vinylaniline, acrylamide, and methacrylamide, without being limited thereto. The ethylenically unsaturated monomer may be present in an amount of about 30 wt % or less, preferably about 1 wt % to about 20 wt %, more preferably about 2 wt % to about 15 wt % in the vinyl-based compound (d2).

(E) Aromatic Vinyl Resin Copolymerized with Alkyl (meth)acrylate

The (E) aromatic vinyl resin copolymerized with an alkyl(meth)acrylate may a copolymer of an alkyl(meth) acrylate and an aromatic vinyl-based compound.

Preferably, the (E) aromatic vinyl resin copolymerized with an alkyl(meth)acrylate is a copolymer of an alkyl(meth) acrylate, an aromatic vinyl compound and a vinyl cyanide compound. Here, the (E) aromatic vinyl resin copolymerized with an alkyl(meth)acrylate is preferably a copolymer of about 5 wt % to about 50 wt % of the alkyl(meth)acrylate, about 30 wt % to about 80 wt % of the aromatic vinyl compound and about 10 wt % to about 40 wt % of the vinyl cyanide compound. More preferably, the alkyl(meth)acrylate is present in an amount of about 10 wt % to about 30 wt %, most preferably in an amount of about 15 wt % to about 20 wt % in the copolymer.

The alkyl(meth)acrylate is a $C_1$ to $C_{10}$ alkyl(meth)acrylate. For example, the alkyl(meth)acrylate may be methyl methacrylate, ethyl methacrylate, propyl methacrylate, butyl methacrylate, methyl acrylate, ethyl acrylate, and the like.

Examples of the aromatic vinyl monomer (aromatic vinyl compound) may include styrene, α-methyl styrene, β-methyl styrene, p-methyl styrene, p-t-butyl styrene, ethyl styrene, vinyl xylene, monochlorostyrene, dichlorostyrene, dibromostyrene, and vinyl naphthalene, without being limited thereto. Styrene is most preferable. These aromatic vinyl monomers may be used alone or as mixtures thereof.

Examples of the vinyl cyanide monomer (vinyl cyanide compound) may include acrylonitrile, methacrylonitrile, and ethacrylonitrile, without being limited thereto. These aromatic vinyl monomers may be used alone or as mixtures thereof. Thereamong, acrylonitrile is preferable.

The (E) aromatic vinyl resin copolymerized with an alkyl(meth)acrylate may have a weight average molecular weight from about 80,000 g/mol to about 200,000 g/mol, preferably from about 120,000 g/mol to about 160,000 g/mol. Within this range, the thermoplastic resin has excellent compatibility and mechanical properties.

The (E) aromatic vinyl resin copolymerized with an alkyl(meth)acrylate may be present in an amount of about 6 wt % to about 12 wt %, preferably about 8 wt % to about 10 wt %. Within this range, the thermoplastic resin composition exhibits excellent heat resistance and surface roughness, and has good property balance between flowability and impact strength.

In the present invention, the weight average molecular weight was measured by gel permeation chromatography GPC (Model No. GPC-16) under conditions of Table 1.

TABLE 1

| Detector: | Differential Refractive Index Detector (RI-8020, Sensitivity: 32, Tosoh Corporation), UV Absorbance Detector (2487, Wavelength: 215 nm, Sensitivity: 0.2 AUFS, Waters Co., Ltd.)), |
|---|---|
| Column: | TSKgel GMHXL (two), G2500HXL (one) (S/N M0052, M0051, N0010, 7.8 mm × 30 cm, Tosoh Corporation), |
| Solvent: | Tetrahydrofuran, |
| Flow rate: | 1.0 mL/min, |
| Column temperature: | 35° C., |
| Sample: | [Concentration] about 0.2% [Filtration] filtered through a 0.45 μm filter. |
| Input: | 0.200 mL, |
| Reference sample: | Mono-dispersed polystyrene |

The thermoplastic resin composition of the present invention may further include typical additives such as lubricants, impact modifiers, dyes, pigments, release agents, dispersants, anti-dripping agents, weather stabilizers, inorganic fillers, inorganic fibers, and the like.

The thermoplastic resin composition of the present invention may be prepared by any method known in the art. For example, the thermoplastic resin composition may be prepared in pellet form by mixing the components of the thermoplastic resin composition and the additives, followed by melt-extrusion using an extruder.

Another aspect of the present invention relates to a molded product prepared by molding the thermoplastic resin composition.

In one embodiment, the molded product is molded using the thermoplastic resin composition and may have an average surface roughness (Ra) from about 10 nm to about 62 nm as measured using an optical profiler (NT1100). For example, the molded product may have a metal layer formed on a surface thereof. The metal layer may include nickel, chromium, aluminum, gold, silver, platinum, copper, lead, tin, or alloys thereof. Preferably, the metal layer is formed of aluminum or aluminum alloys. Preferably, the molded product is applied to housings for automobile lamps.

MODE FOR INVENTION

Next, the present invention will be better understood from the following examples and comparative examples. It should be understood that these examples are provided for illustration only and are not to be construed in any way as limiting the scope of the invention.

Descriptions of details apparent to those skilled in the art will be omitted.

EXAMPLES

Components of thermoplastic resin compositions of the following examples and comparative examples were as follows.

(A) Rubber-modified aromatic vinyl graft copolymer resin: A mixture of g-ABS (manufactured by Cheil Industries Inc., product name: Starex CHT) and SAN (manufactured by Cheil Industries Inc., product name: HF-5661) was used.

(B) Polyester resin: Recycled PET (manufactured by Samyang Co., Ltd., product name: Recycled PET Bottle Flakes) was used.

(C) Maleimide-based polymer: PMI (manufactured by DENKA Co., Ltd., product name: MS-NI) was used.

(D) Aromatic vinyl compound-vinyl cyanide compound copolymer resin containing a functional group capable of reacting with polyester (GMA-SAN): To a mixture of 120 parts by weight of deionized water and 100 parts by weight of a monomer mixture, which consists of 0.5 parts by weight of glycidyl methacrylate, 70.5 parts by weight of styrene and 29 parts by weight of acrylonitrile, 0.2 parts by weight of azobisisobutyronitrile, 0.4 parts by weight of tricalcium phosphate and 0.2 parts by weight of a mercaptan-based chain transfer agent were added, heated from room temperature to 80° C. over 60 minutes, and maintained at this temperature for 180 minutes, thereby preparing an epoxy-containing styrene-acrylonitrile copolymer resin (GMA-SAN). Then, the obtained copolymer resin was washed with water, dehydrated and dried to form epoxy-containing styrene-acrylonitrile copolymer resin (GMA-SAN) powder to be used in the examples and comparative examples.

(E) Aromatic vinyl resin copolymerized with alkyl(meth) acrylate: To a mixture of 120 parts by weight of deionized water and 100 parts by weight of a monomer mixture, which consists of 74 parts by weight of methyl methacrylate, 21 parts by weight of styrene and 5 parts by weight of acrylonitrile, 0.2 parts by weight of azobisisobutyronitrile, 0.4 parts by weight of tricalcium phosphate and 0.2 parts by weight of a mercaptan-based chain transfer agent were added, heated from room temperature to 80° C. over 60 minutes, and maintained at this temperature for 180 minutes, thereby preparing a methyl methacrylate-styrene-acrylonitrile copolymer resin (MSAN). Then, the obtained copolymer resin was washed with water, dehydrated and dried to form methyl methacrylate-styrene-acrylonitrile copolymer resin (MSAN) powder to be used in the examples and comparative examples.

Examples 1 to 3 and Comparative Examples 1 to 3

The respective components were added in amounts as listed in the following Table 2, followed by extrusion molding using a twin-screw extruder at 250° C., thereby preparing thermoplastic resin compositions in pellet form. The prepared pellets were subjected to injection molding (LGH 140N) at 250° C. to prepare specimens.

TABLE 2

|  | Example | | | Comparative Example | | |
| --- | --- | --- | --- | --- | --- | --- |
|  | 1 | 2 | 3 | 1 | 2 | 3 |
| (A) ABS g-ABS | 24 | 24 | 24 | 24 | 24 | 24 |
| (A) ABS SAN | 36 | 33 | 30 | 42 | 39 | 27 |
| (B) PET | 12 | 12 | 12 | 12 | 12 | 12 |
| (C) PMI | 14 | 14 | 14 | 14 | 14 | 14 |
| (D) GMA-SAN | 8 | 8 | 8 | 8 | 8 | 8 |
| (E) MSAN | 6 | 9 | 12 | 0 | 3 | 15 |
| Surface roughness (nm) | 60.17 | 56.82 | 58.47 | 68.16 | 63.88 | 67.08 |
| HDT (° C.) | 97.9 | 98.6 | 97.0 | 94.3 | 95.4 | 96.4 |

Unit: wt %

<Property Evaluation>

1. Surface roughness: Average surface roughness was measured on an area of 2.4 mm×1.9 mm using an optical profiler (Veeco Co., Ltd., NT1100) (unit: nm).

2. Heat deflection temperature (HDT): HDT was measured in accordance with ASTM D 648. Evaluation was performed by applying a load of 18.5 kg/cm$^2$ to a ¼-inch thick specimen. Results were evaluated according to an average of five specimens.

As shown in Table 2, it could be seen that the thermoplastic resin compositions prepared in Examples 1 to 3 exhibited high heat deflection temperature and excellent surface roughness, whereas the thermoplastic resin compositions prepared in Comparative Examples 1 to 3 had lower surface roughness and heat deflection temperature than those of the examples.

Although some embodiments have been disclosed herein, it should be understood by those skilled in the art that these embodiments are provided by way of illustration only, and that various modifications, changes, and alterations can be made without departing from the spirit and scope of the invention. Therefore, these examples are not to be construed in any way as limiting the present invention.

The invention claimed is:

1. A molded product comprising a thermoplastic resin composition comprising:
   (A) about 10 wt % to about 60 wt % of a rubber-modified aromatic vinyl graft copolymer resin;
   (B) about 10 wt % to about 60 wt % of a polyester resin;
   (C) about 1 wt % to about 40 wt % of a maleimide-based polymer, wherein the maleimide-based copolymer (C) is a copolymer of an N-substituted maleimide, an unsaturated dicarboxylic acid anhydride, and a vinyl monomer;
   (D) about 5 wt % to about 40 wt % of a modified aromatic vinyl compound-vinyl cyanide compound copolymer resin containing a functional group capable of reacting with polyester,
   wherein the modified aromatic vinyl compound-vinyl cyanide compound copolymer resin (D) has a weight average molecular weight from about 50,000 g/mol to about 200,000 g/mol and
   wherein the modified aromatic vinyl compound-vinyl cyanide compound copolymer resin (D) is a copolymer of about 0.01 mol % to about 5 mol % of (d1) an unsaturated compound represented by the following Formula 1 and (d2) about 95 mol % to about 99.99 mol % of a vinyl-based compound,

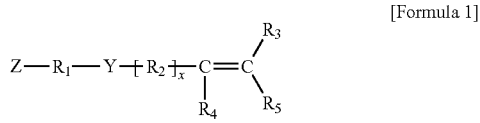

[Formula 1]

wherein in Formula 1, $R_3$, $R_4$ and $R_5$ are each independently hydrogen (H), a $C_1$~$C_{12}$ alkyl group or unsaturated alkyl group, a $C_6$~$C_{14}$ aryl group, or a $C_1$~$C_{12}$ alkyl-substituted aryl group or unsaturated alkyl-substituted aryl group; Y is an ether group (—O—), a carboxyl group (—O—[C=O]—, —[O=C]—O—), a $C_1$~$C_{12}$ alkylene group, a $C_6$~$C_{14}$ arylene group, or a $C_1$~$C_{12}$ alkyl-substituted arylene group; when Y is an ether group or a carboxyl group, each of $R_1$ and $R_2$ is a $C_1$~$C_{12}$ alkylene group, a $C_6$~$C_{14}$ arylene group, or a $C_1$~$C_{12}$ alkyl-substituted arylene group, and when Y is a $C_1$~$C_{12}$ alkylene group or a $C_6$~$C_{14}$ arylene group or alkyl-substituted arylene group, Y represents ($R_1$—Y—$R_2$); x is 0 or 1; and Z is an epoxy group, a carboxylic acid group, an isocyanate group, an oxadiazol group, an amine group, or a hydroxyl group; and (E) about 6 wt % to about 12 wt % of an aromatic vinyl resin which is a copolymer of an alkyl(meth)acrylate, aromatic vinyl compound, and vinyl cyanide,
   wherein the molded product prepared by molding the thermoplastic resin composition has an average surface roughness (Ra) from about 10 nm to about 62 nm as measured using an optical profiler (NT1100).

2. The molded product comprising the thermoplastic resin composition according to claim 1, wherein the polyester resin (B) is a recycled polyester resin.

3. The molded product comprising the thermoplastic resin composition according to claim 1, wherein the maleimide-based polymer (C) has a weight average molecular weight from about 80,000 g/mol to about 200,000 g/mol.

4. The molded product comprising the thermoplastic resin composition according to claim 1, wherein the maleimide-based polymer (C) comprises about 20 mol % to about 55 mol % of repeat units derived from maleimide.

5. The molded product comprising the thermoplastic resin composition according to claim 1, wherein the (E) aromatic vinyl resin copolymerized with an alkyl(meth)acrylate has a weight average molecular weight from about 80,000 g/mol to about 200,000 g/mol.

6. The molded product comprising the thermoplastic resin according to claim 1, wherein the molded product has a metal layer formed on a surface thereof.

7. The molded product comprising the thermoplastic resin composition according to claim 1, wherein the (E) aromatic vinyl resin is a copolymer consisting of an alkyl(meth)acrylate, aromatic vinyl compound, and vinyl cyanide.

* * * * *